US011916962B2

(12) United States Patent
Jain et al.

(10) Patent No.: US 11,916,962 B2
(45) Date of Patent: Feb. 27, 2024

(54) DATA DRIVEN INTERFACES FOR DECOUPLING COMPONENTS OF A MANAGEMENT SYSTEM FROM MANUFACTURER AND PLATFORM OF MANAGED CLIENT DEVICES

(71) Applicant: VMware LLC, Palo Alto, CA (US)

(72) Inventors: Adarsh Subhash Chandra Jain, Atlanta, GA (US); Bhavesh Krishna Kumar, Atlanta, GA (US); Sachin Ramachandran, Atlanta, GA (US); Naveen Pitchandi, Atlanta, GA (US); Allan Howard, Atlanta, GA (US); Kai Chen, Atlanta, GA (US)

(73) Assignee: VMware, Inc., Palo Alto, CA (US)

( * ) Notice: Subject to any disclaimer, the term of this patent is extended or adjusted under 35 U.S.C. 154(b) by 419 days.

(21) Appl. No.: 17/136,373

(22) Filed: Dec. 29, 2020

(65) Prior Publication Data

US 2022/0210193 A1   Jun. 30, 2022

(51) Int. Cl.
  *H04L 29/06*   (2006.01)
  *H04L 29/08*   (2006.01)
  *H04L 12/24*   (2006.01)
  *H04L 9/40*    (2022.01)
  *H04L 41/22*   (2022.01)
  *H04L 67/561*  (2022.01)

(52) U.S. Cl.
  CPC .............. *H04L 63/20* (2013.01); *H04L 41/22* (2013.01); *H04L 63/0876* (2013.01); *H04L 63/102* (2013.01); *H04L 67/561* (2022.05)

(58) Field of Classification Search
  CPC ..... H04L 63/20; H04L 41/22; H04L 63/0876; H04L 63/102; H04L 67/561; H04L 67/303; H04L 41/046; H04L 41/0894
  USPC .......................................................... 726/1
  See application file for complete search history.

(56) References Cited

U.S. PATENT DOCUMENTS 10,303,343 B1 * 5/2019 Rykowski ............. G06F 3/0605
2017/0242852 A1 * 8/2017 Clain .................... G06F 40/174
2022/0006701 A1 * 1/2022 Patel ...................... H04L 41/22

* cited by examiner

*Primary Examiner* — Tu T Nguyen
(74) *Attorney, Agent, or Firm* — King Intellectual Asset Management

(57) ABSTRACT

Disclosed are examples related to data driven interfaces for decoupling management system components from a manufacturer or a platform of client devices managed by the management system. In some examples, among others, a system can generate a data driven interface template that can be used to cause rendering of a data driven user interface for configuring a profile payload of a device profile for the client device. The system can generate, based on values associated with the data driven user interface, a profile document in an instance in which values are obtained from the data driven user interface. In some aspects, the profile document is a generic representation of the profile payloads for the platform, the manufacturer or the type of the client device.

20 Claims, 20 Drawing Sheets

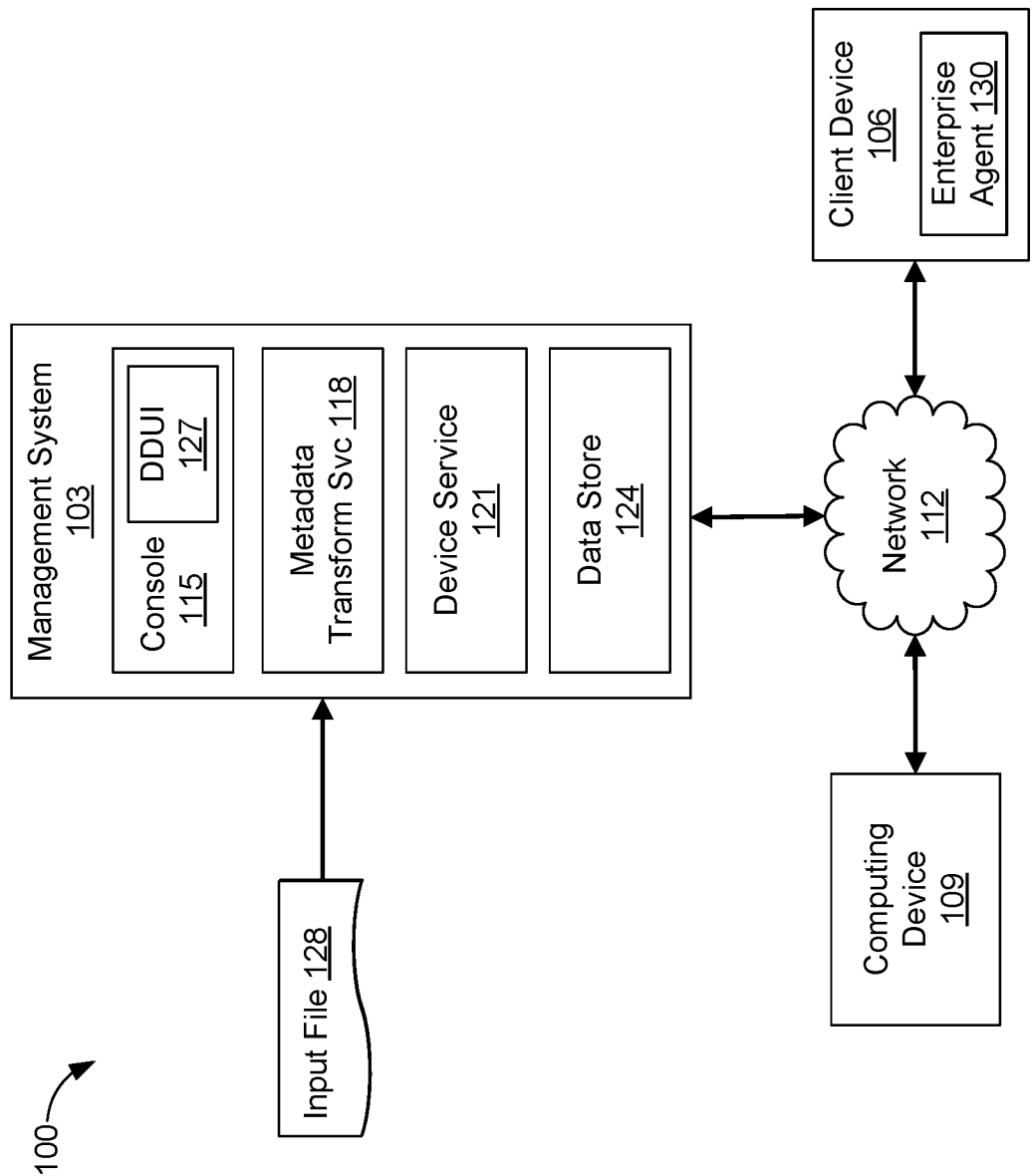

```
{
    "Id": "tab_content",
    "FieldType": 2000,
    "Value": "",
    "Label": "Content",
    "IsActive": false,
    "ShowIcon": true,
    "ShowEnable": true,
    "EnableName": "Configure",
    "Fields": [
        {
            "Id": "contentpopups_enum_bookmarksbar",
            "IsVisible": true,
            "FieldType": 5,
            "Label": "Bookmark Bar",
            "Value": "BOOKMARKS_BAR_ENABLED_MODE_UNSPECIFIED",
            "OptionData": [
                {
                    "Key": "BOOKMARKS_BAR_ENABLED_MODE_UNSPECIFIED",
                    "Value": "User can show/ hide the bookmarks bar"
                },
                {
                    "Key": "BOOKMARKS_BAR_ENABLED_ALWAYS",
                    "Value": "Always show the bookmarks bar"
                },
                {
                    "Key": "BOOKMARKS_BAR_ENABLED_NEVER",
                    "Value": "Never show the bookmarks bar"
                }
            ]
        },
        {
            "Id": "contentpopups_bool_editBookmarks",
            "FieldType": 24,
            "Value": "0",
            "IsDisabled": false,
            "Label": "Editing Bookmarks",
            "OptionData": [
                {
                    "Key": "0",
                    "Value": "Enable"
                },
                {
                    "Key": "1",
                    "Value": "Disable"
                }
            ]
        },
        {
            "Id": "general_contentmanagebookmarks",
            "FieldType": 24,
            "IsVisible": true,
            "Label": "Managed Bookmarks",
            "Tooltip": "Push a list of bookmarks ...",
            ...
```

FIG. 2B

```
{
    "general_CloudProfileData_ProfileLocationGroupID": "571",
    "general_CloudProfile_ProfileID": "0",
    "general_CloudProfileData_LocationGroupUUID": "79edaaea-4f7c-4f7c-ac1b-
c7266d7dde91",
    "general_CloudProfile_ProfileUUID": "23729af7-21e5-497f-4f7c-38540bd791da",
    "general_profile_name": "Test",
    "general_profile_description": "",
    "general_profile_assignment_type": "1",
    "general_profile_managed_by_m": "571",
    "general_profile_managed_by": {
    "key": 571,
    "value": "Chrome"
    },
    "general_profile_assignment_groups_m": "",
    "general_profile_assignment_groups": "Chrome",
    "general_profile_exclusion": "0",
    "general_profile_excluded_groups_m": "",
    "contentpopups_enum_bookmarksbar":
    "BOOKMARKS_BAR_ENABLED_MODE_UNSPECIFIED",
    "contentpopups_bool_editBookmarks": "0",
    "general_contentmanagebookmarks": "0",
    "contentpopups_enum_homebutton": "SHOW_HOME_BUTTON_MODE_UNSPECIFIED",
    "contentpopups_enum_homepage": "HOMEPAGE_MODE_UNSPECIFIED",
    "contentpopups_homepageurl": "",
    "contentpopups_configuration": "1",
    "contentpopups_enum_defaultsettings":"POPUPS_DEFAULT_MODE_UNSPECIFIED",
    "general_contentpopups_openatstartup": "0"
}
```

```
[
    {
        "profile_uuid": "5c115e7a-191a-1414-88ee-ef7489b53ba1",
        "profile_unique_key": "590589e6-29b9-4141-844d-bd933d3123db",
        "version": 1,
        "native_client_payload_exists": false,
        "lock_on_device": false,
        "profile_context": "Device",
        "unlock_password": "",
        "profile_payload": [
            {
                "PayloadType": "com.airwatch.winrt.encryption",
                "EncryptedVolume": "1",
                "EncryptionMethod": "0",
                "FallBackToDefaultMethod": "False",
                "StoreRecoveryKeyInAirWatch": "True",
                "EnforceAuthenticationPin": "False",
                "SuspendBitlockerType": "1",
                "ScheduledStartTime": "0",
                "ScheduledEndTime": "0",
                "ScheduledRepeatType": "1",
                "EncryptRemovableDevices": "False",
                "UsedSpaceEncryption": "False",
                "RealTimeEnforcement": "False",
                "SystemEncryptionOnUnenrollment": "False",
                "AuthenticationMode": "2",
                "MinimumPasswordLength": "8",
                "MinimumPinLength": "4",
                "UsePasswordIfTpmNotAvailable": "False",
                "EnableBitlockerSuspend": "False",
                "IsStaticRecoveryKeyEnabled": "True",
                "StaticRecoveryKey": "653895-386364-036388-141414-400059-167453-096195-553597",
                "RecoveryKeyRotateAfter": "2",
                "RecoveryKeyGracePeriod": "0",
                "StaticRecoveryKeyGenerationTimeStamp": "2020-04-13 10:05:50.490",
                "SuspendBitlockerUntilTpmIsInitialized": "False"
            }
        ]
    },
    {
        "profile_uuid": "c73547d7-7802-4de5-8b43-3961f9f313dc",
        "profile_unique_key": "7d925f73-0012-4905-8405-fa13c3942447",
        "version": 1,
        "native_client_payload_exists": true,
        "lock_on_device": false,
        "profile_context": "Device",
        "unlock_password": "",
         ...
```
221

FIG. 2E

```
{
  "managedBookmarks": {
  "managedBookmarks":"[{\"toplevel_name\":\"My Favorites\"},
  { \"url\":\"www.google.com/photos\",\"name\":\"Photos\"},
  {\"url\":\"www.youtube.com\", \"name\":\"YouTube\"}]"
  },
  "popupsDefaultSettings": {
  "popupsDefaultMode": "POPUPS_DEFAULT_MODE_UNSPECIFIED"
  },
  "popupsAllowedForUrls": {},
  "popupsBlockedForUrls": {},
  "showHomeButton": {
  "showHomeButtonMode": "SHOW_HOME_BUTTON_MODE_UNSPECIFIED"
  },
  "homepageSettings": {
  "homepageMode": "HOMEPAGE_MODE_UNSPECIFIED"
  },
  "editBookmarksDisabled": {
  "editBookmarksDisabled": true
  },
  "bookmarksBarEnabled": {
  "bookmarksBarEnabledMode": "BOOKMARKS_BAR_ENABLED_ALWAYS"
  }
}
```

Management Interface  [Global ⌄]                                         Add⌄ | ⚲ ✱ ⊙ | UX ⌄

Assignment - Test_Profile

Assignment
Smart Groups            Search for Groups ⌄
                        (AG_1234) (SG_1234) (Atlanta_RD) (Bengaluru_RD)

Allow Exclusions        ◯

Excluded Groups         Search for Groups ⌄

Deployment
Profile Scope           Production ⌄
Assignment Type         Auto ⌄
Allow Removal           Always ⌄
Managed by              pmalon ⌄ install only on devices
in selected areas       ◯

Schedule installation
time periods            ◯

« Preview
┌─────────────────────┐
│ Total Assigned Devices │
│ 122                 │
│                     │
│ Total Enrolled Devices │
│ 13008               │
└─────────────────────┘

VIEW DEVICES — 412

CANCEL  BACK
        SAVE — 403
        PUBLISH — 409

| Management Interface | Global ▼ | | | Add ▼ | ⚲ ✦ ◉ | UX ▼ | ▦ |

Assignment- Test_Profile      ✕

Assignment
Smart Groups    Search for Groups
     (AG_1234) (SG_1234)

Allow Exclusions ⊙

Excluded Groups    Search for Groups

« Preview

| Status | ▼ ┃ Serial Number | ▼ ┃ Friendly Name | ▼ ┃ User | ▼ ┃ OG |
|---|---|---|---|---|
| ⊙ Added | 546BA87RK98 | Example 1 | qxie33 | yardman |
| ⊙ Added | HGF7UC88K73 | Test Device Y23 | br810 | Test |
| ⊗ Removed | POP5467HRT | Example 2 | jdj | yardman |
| ⊗ Removed | ME433OW981 | test 2 FEUL | voldemort | Test |
| ⊙ Unchanged | PU443RR87RR | Example 3 | mtople | yardman |
| ⊙ Unchanged | 1AW2SO7M32E | Example 4 | ouroborse | yardman |
| ⊙ Unchanged | W99OO880077 | test 232 device | mtople | Test |

Deployment
Profile Scope    Production    >
Assignment Type    Auto    >
Allow Removal    Always    >
Managed by    pmalon    >

Install only on devices ⊙
in selected areas

Schedule installation ⊙
time periods

CANCEL | BACK | SAVE | PUBLISH
             403    409

127

Section [Profiles ▼]　　　Platform [Android ▼]　　　Payload [Email ▼]　　500

Edit the metadata directly below.

```
 1    
 2    {
 3      "Id" : "ddvi-exchange-activesync-profile",
 3      "TestId" : "data-ats-ddvi-exchange-activesync-profile",
 4      "IncType": "application/x-wvv-form-urimcoded",
 5      "Legend": {
 6        "Title" : "Exchange ActiveSync"
 7      },
 8      "Provider" : {
 9        "Type": "cached",
10        "uri" : "a",
11        "method":"POST"
12      },
13      "fieldset": {
14        {
15          "Id": "ConfigurationTabs",
16          "TestId" : "data-ats-test-ConfigurationTabs",
17          "FieldType" : 2001,
18          "Label": "Configuration",
19          "Allowed" : true,
20          "AddbuttonText":"+Add",
21          "ActiveIndex":: 0,
22          "DeletebuttonLabel" : "Delete",
23          "Cancelbuttonlabel" : "Cancel",
24          "DeleteTabTitleLAbel": "Delete Configuration",
25          "DeleteTabContentLabel": "Are you sure you want to delete this tab?",
26          "Tooltip" : "Use these controls to add configurations.",
27          "TooltipPo2" : "right",
28          "Fields" : [
29            {
30              "Id" : "tab",
31              "TestId" : "data-ats-test-tab",
32              "FieldType" : 2001,
33              "Label" : "Configuration",
34              "InActive" : false,
35              "Showlegend" : false,
36              "ShowIcon" : false,
37              "TabIcon" : " ",
```

Updated Keys for Device Delivery

```
1    {
2      "Id" : "ddvi-exchange-activesync-profile",
3      "TestId": "data-ats-ddvi-exchange-activesync-profile",
3      "IncType":"application/x-wvv-form-urimcoded",
4      "Legend": {
5        "Title" : "ExchangeActiveSync"
6      },
7      "Provider": {
8        "Type": "cached",
9        "vri" : "a",
10       "rethod":"POST"
11     },
12     "fieldset": {
13       {
14         "Id":"ConfigurationTabs",
15         "TestId": "data-ats-test-ConfigurationTabs"
16         "FieldType": 2001,
17         "Label":"Configuration",
18         "Allowed": true,
19         "AddbuttonText":"+Add",
20         "ActiveIndex":: 0,
21         "DeletebuttonLabel": "Delete",
22         "Cancelbuttonlabel": "Cancel",
23         "DeleteTabTitleLAbel": "Delete Configuration",
24         "DeleteTabContentLabel" "Are you sure you want to delete this tab?",
25         "Tooltip": "Use these controls to add configurations.",
26         "TooltipPo2": "right",
27         "Fields" : [
28           {
29             "Id" : "tab",
30             "TestId": "data-ats-test-tab",
31             "FieldType": 2001,
32             "Label" : "Configuration",
33             "InActive": false,
34             "Showlegend": false,
35             "ShowIcon": false,
36             "TabIcon" : " ",
37
```

Release Notes

PUBLISH

FIG. 5-3

DATA DRIVEN INTERFACES FOR DECOUPLING COMPONENTS OF A MANAGEMENT SYSTEM FROM MANUFACTURER AND PLATFORM OF MANAGED CLIENT DEVICES

BACKGROUND

In the enterprise environment, administrators may be tasked with enforcing security policies of the enterprise on client devices, such as smartphones, tablets, and laptops. A management system can enable the administrator to control which features of a platform, an operating system, or an application could be accessed on the client device according to the security policies. This task can be problematic when enterprise security policies have to be enforced on client devices having different platforms, operating systems, manufacturers and types.

Many management systems include components that are intertwined with various versions, e.g., of the platform, the manufacturer or the type of the client device. As new features become available to the client device or new capabilities are added to third-party device management platforms, it can be difficult to control the features and enforce security policies using such a management system without updates to the components of the management systems.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

FIGS. 1A and 1B are drawings of an example of a networked environment according to various embodiments of the present disclosure.

FIG. 2B is an example excerpt of a data driven interface template for the management system according to various embodiments of the present disclosure.

FIG. 2D is an example excerpt of values associated with the form of FIG. 2C according to various embodiments of the present disclosure.

FIG. 2E is an example excerpt of a profile document that is a generic format for the management system according to various embodiments of the present disclosure.

FIG. 2F is an example excerpt of a device readable document for the management system according to various embodiments of the present disclosure.

FIGS. 4A-4D are drawings of user interfaces according to various embodiments of the present disclosure.

FIGS. 5-0 to 5-3 are drawings of an administrative user interface according to various embodiments of the present disclosure.

DETAILED DESCRIPTION

Figure 1B:
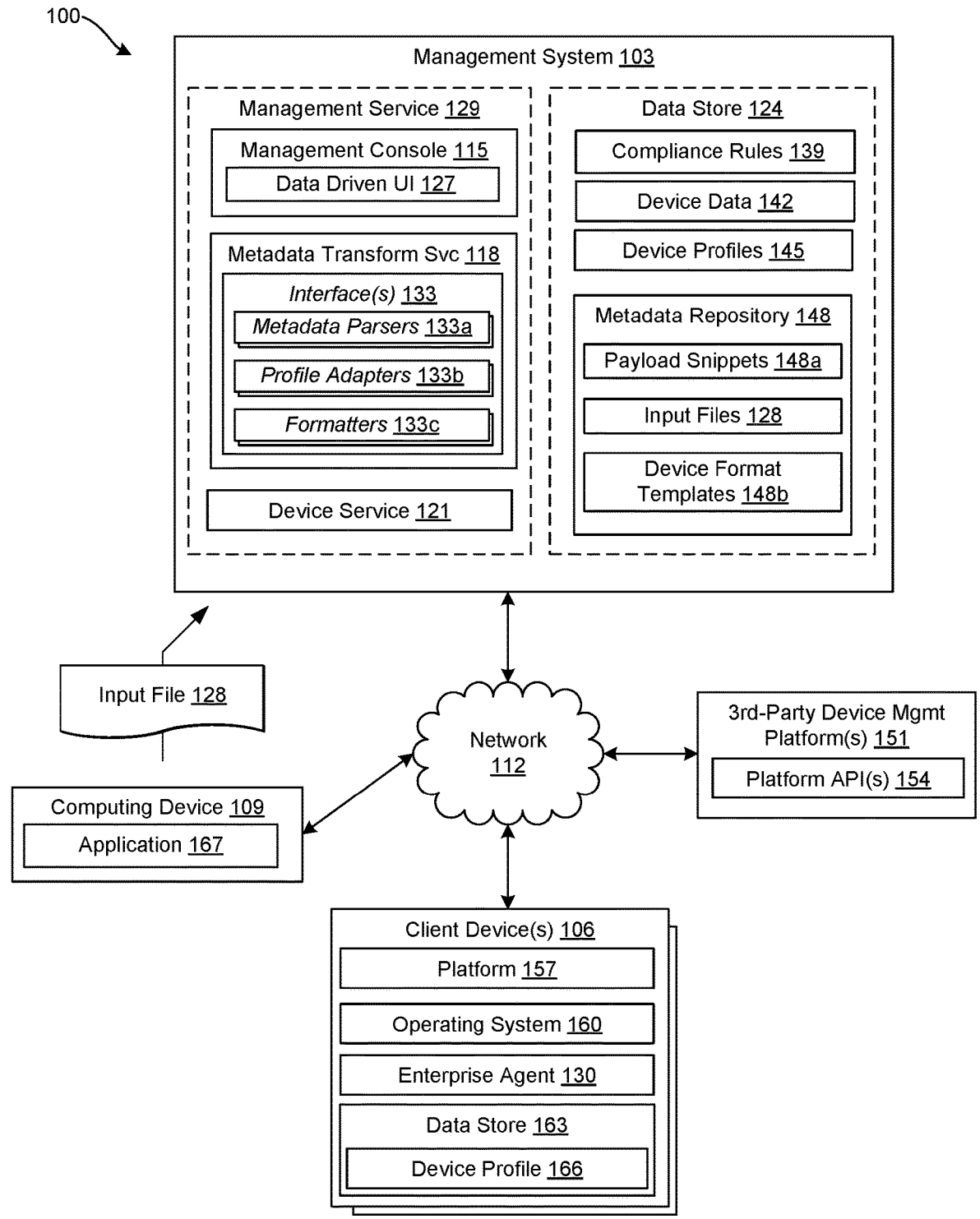

The present disclosure relates to approaches for decoupling components of a management system from a platform, an operating system, a manufacturer or a type of a client device. A management system enforces security policies of an enterprise on client devices, such as smartphones, tablets, laptops, and other suitable computing devices. The management system can include a management console, an enterprise agent, and various other components that can perform functionality to enable an enterprise administrator to control aspects of enforcing the security policies.

In prior systems, components of the management system enabled the enterprise administrator to control which features of a platform, an operating system, or an application could be accessed on the client device according to the security policy. However, many management systems include components that are intertwined with various versions, e.g., of the platform, the manufacturer or the type of the client device. Controlling features and enforcing security policies using such a management system can be problematic for a number of reasons.

For instance, platforms and operating systems are continuously provided by consortiums and organizations including the Open Handset Alliance™, Google™, Apple™ Microsoft™, Blackberry™, and Nokia™, among others. Application programming interfaces (APIs) for management of the client devices are also introduced, updated and deprecated.

Developers can generate various versions of the platforms, operating systems, etc., in order to provide new features or settings. New platforms can be created to focus on particular categories of devices such as Internet of Things (IoT) devices. In a process known as forking, new platforms or new operating systems can be created based on taking existing code and starting an independent project based on the code.

Examples of new features can include new camera capabilities, new Wi-Fi settings, a "Do Not Disturb While Driving" feature, new device tracking capabilities, new messaging applications, and other suitable features related to a platform, an operating system, a manufacturer or a type of a client device. The type of the client device can in some instances refer to a subset of devices from a manufacturer (e.g., "iPhone 11" devices from Apple™) or a model name (e.g., "iPhone 11 Pro Max"), a model number or Stock Keeping Unit (SKU, e.g., "MWLR2LL/A"), or other designation that is relevant to enforcing security policies on the client device.

Given these variations, it could therefore be problematic for prior management systems to enforce security policies for client devices having access to new platforms or new features without updates to the components of the management systems. For example, consider a management console of the management system. The management console can render a user interface that includes platform- or feature-specific parameters to allow an administrator to enter input to facilitate enforcing security policies about the platform or the feature. Various aspects of the management console or the user interface may need to be updated to support new platforms or new features. Additionally, the management system can interact with the client device through an enterprise agent that oversees the operation of the client device. The enterprise agent may need to be updated to support new platforms or new features. Approaches described herein can decouple components of a management system from the platform, the operating system, the manufacturer or the type of the client device.

In the following discussion, examples of systems and their components are described, followed by examples of the operation of those systems.

With reference to FIGS. 1A and 1B, shown are examples of a networked environment 100. FIG. 1A shows that the networked environment 100 can include a management system 103, one or more client device(s) 106, and a computing device 109 in data communication over a network 112. The network 112 can include the internet, one or more intranets, extranets, wide area networks (WANs), local area networks (LANs), wired networks, wireless networks, or any combination of two or more such networks. The network 112 can include satellite networks, cable networks, Ethernet networks, cellular networks, and telephony networks.

The management system 103 can include a server computer or any other system providing computing capability. Alternatively, the management system 103 can include a plurality of computing devices that are arranged, for example, in one or more server banks, computer banks, or other arrangements. The management system 103 can include a grid computing resource or any other distributed computing arrangement. The computing devices can be located in a single installation or can be distributed among many different geographical locations. The management system 103 can also include or be operated as one or more virtualized computer instances. For purposes of convenience, the management system 103 is referred to in the singular. Even though the management system 103 is referred to in the singular, it is understood that a plurality of management systems 103 can be employed in the various arrangements as described above.

The management system 103 can execute a management console 115, a metadata transform service 118, a device service 121, and other applications, services, processes, systems, engines, or functionality not discussed in detail herein. The management system 103 can also access a data store 124. The data store 124 can be representative of a plurality of data stores 124 as can be appreciated. The data stored in the data store 124, for example, is associated with the operation of the various applications and/or functional entities described herein.

In some examples, an enterprise, such as one or more organizations, can operate the management system 103 to oversee or manage the operation of the client devices 106 of its employees, contractors, customers, students, or other users having user accounts with the enterprise. The enterprise can have a hierarchy or organizational structure that links the individuals and/or groups in the enterprise. For example, an individual or group can be responsible for management of one or more subordinate individuals or groups, who can in turn be responsible for management of one or more subordinate individuals or groups, and so on.

The management system 103 can cause various software to be installed or features to be configured on the client device 106. Software can include, for example, client application(s), an operating system or operating system updates, an enterprise agent 130, resources, libraries, drivers, or other similar components that require installation on the client device 106 as specified by an administrator of the management system 103. The management system 103 can further cause policies to be implemented on the client device 106 by way of a device profile. Policies can include, for example, restrictions or permissions pertaining to capabilities of the client device 106 such that access to enterprise data is secured on the client device 106. Policies can also include restrictions or permissions about features of the platform, the operating system, the manufacturer or the type of the client device 106.

The management console 115 can be executed to generate and manage device profiles used to enforce enterprise security policies on the client devices 106. The management console 115 can include a data driven user interface (UI) 127 that dynamically renders a profile user interface. Systems and methods for data driven user interfaces for device management, including retrieving a definition file associated with a platform and rendering a data driven user interface for configuring the device profile based at least in part on the definition file, are discussed in greater detail in connection with Rykowski et al. application Ser. No. 15/865,885, filed Jan. 9, 2018, U.S. Pat. No. 10,303,343, issued May 28, 2019, and Rykowski et al. application Ser. No. 15/865,872, filed Jan. 9, 2018, each of which is hereby incorporated by reference herein in its entirety.

The metadata transform service 118 can generate interfaces, templates, or documents that are associated with data driven interfaces for the management console 115, the device service 121, the enterprise agent 130, or other components provided by the management system 103. In some examples, an administrator uses the computing device 109 to cause the metadata transform service 118 to consume an input file 128 that allows the data driven UI 127 to be rendered. The metadata transform service 118 can also generate a profile document for the device service 121. In some examples, the metadata transform service 118 causes a device readable document to be created for the enterprise agent 130. Although the metadata transform service 118 is shown as executing on the management system 103, these services or at least a portion of the transforms or translations they describe can occur at the client device 106 or otherwise be executed by client-side instructions suitable for performing the transforms.

The management system 103 and the client device 106 can interact through a device service 121 or any other service suitable for performing management functions. In one example, the management system 103 can interact with an enterprise agent 130 to enroll the client device 106 with the management system 103. The enterprise agent 130 can be registered as a device administrator of the client device 106, which can provide the enterprise agent 130 with sufficient privileges to control the operation of the client device 106 when it is enrolled as a managed device. In one example, the enterprise agent 130 can be registered as the device administrator through the installation of a device profile at an operating system that causes the operating system to designate the enterprise agent 130 as the device administrator. In some examples, the enterprise agent 130 can receive instructions from the management system 103 to install the device profile on the client device 106.

The management system 103 can direct the enterprise agent 130 to perform various device management functions on the client device 106. For example, the management system 103 can direct the enterprise agent 130 to control access to software or hardware functions available to the client device 106. As a result, the management system 103 can verify that the configuration and operation of the client device 106 is in conformance with predefined criteria that ensures that enterprise data or other data is protected from data loss, unauthorized access, or other harmful events.

In some examples, the management system 103 can cause the enterprise agent 130 to control use of the client device 106, or provision enterprise data to the client device 106, through use of a command queue provided by the device service 121. The management system 103 can store commands and other suitable content in a command queue associated with a particular client device 106 and can configure the enterprise agent 130 executed by such client device 106 to retrieve the contents of the command queue via the device service 121. In some other examples, the command queue can be stored in the data store 124.

The enterprise agent 130 can be configured to retrieve the contents of the command queue on a configured interval, such as every four hours, or upon detection of a certain event, such as an unauthorized application being executed by the client device 106. In some cases, the enterprise agent 130 can instruct the client device 106 to retrieve the content of the command queue by activating a uniform resource locator (URL) link. The management system 103 can also push commands to the enterprise agent 130 over the network 112. In addition, a particular command queue can arranged for a particular client device 106. For example, after a new device profile has been generated for a particular client device 106, the device profile can be stored in a particular command queue associated with the particular client device 106 for retrieval by the client device 106.

In any case, the enterprise agent 130 can receive the contents of the command queue from the device service 121 of the management system 103, or from the data store 124. In one example, the contents of the command queue can include one or more commands for the enterprise agent 130 to execute on the client device 106. In another example, the contents of the command queue can include a resource or a client application that the enterprise agent 130 should cause to be installed on the client device 106, which the client device 106 can access through a specified uniform resource locator (URL).

FIG. 1B shows another example of the networked environment 100 of FIG. 1A. The management system 103, client device 106, computing device 109, network 112, management console 115, metadata transform service 118, device service 121, data store 124, and the input file 128 have been introduced above with regard to FIG. 1A. The management system 103 as shown in FIG. 1B provides a management service 129 which can include the management console 115, the metadata transform service 118, the device service 121, one or more interfaces 133, and other applications, services, processes, systems, engines, routines, or functionality not discussed herein.

The metadata transform service 118 can generate interfaces 133 which are executed to provide a mobile device management Application Programming Interface (API), batch update services, and other interfaces that allow the management console 115, the device service 121, the enterprise agent 130, or another component provided by the management system 103 to interact with the metadata transform service 118 or to consume templates or documents generated by the metadata transform service 118. In some examples, the interfaces 133 can be omitted from the management service 129. In this scenario, the management console 115, the device service 121, or the enterprise agent 130 can be configured to directly consume templates or documents generated by the metadata transform service 118.

The interfaces 133 that can be generated by the metadata transform service 118 include metadata parsers 133*a*, profile adapters 133*b*, platform formatters 133*c*, or other functionality for tying any input to any output (e.g., in terms of nodes and settings). The interfaces 133 can extend the mobile device management Application Programming Interface (API) discussed previously to include a Payloads API, a Template Document API, or other suitable functions or APIs. The Payloads API can for example provide a list of profile payloads for a given platform or operating system, or to provide a data driven interface template that the metadata transform service 118 has generated. The Template Document API can be executed to create an eXtensible Markup Language (XML) or JavaScript Object Notation (JSON) template document for any supported document types (e.g., device profile, or app configuration). The Template Document API can also be executed to create a new template document using key-value pairs that are available to the metadata transform service 118.

The metadata parsers 133*a* are executed to parse metadata from the input file 128 and create data to be stored in the data store 124. The metadata parsers 133*a* can also be executed to create a data driven interface template or any suitable documents or templates associated with data driven interfaces for the management system 103. In one example, the metadata parsers 133*a* can generate the data driven interface template to be consumed by the management console 115.

The profile adapters 133*b* are executed to generate and store profile documents about platforms, operating systems, and configuration of various types of the client devices 106. Some examples of the profile adapters 133*b* include an Android™, Profile Adapter, a Windows™ Profile Adapter, an Apple™ Profile Adapter, an App Config (Android™) Profile Adapter, an App Config (iOS™) Profile Adapter, and other Profile Adapters that the metadata transform service 118 can generate based on other platforms (known now or in the future) which can be represented within the input file 128. In some examples, the profile adapters 133*b* can generate a profile document that is a generic representation of a device profile (or at least one plurality of profile payloads of the device profile) for the platform, the manufacturer or the type of the client device 106.

The platform formatters 133*c* are executed to format (or reformat) the generic representation of the device profile for the client device 106 into a device-dependent format that can be specific to the client device 106 or a platform, an operating system, a manufacturer or a type of the client device 106.

The example depicted in FIG. 1B shows that the data stored in the data store 124 further includes, for example, compliance rules 139, device data 142, device profiles 145, a metadata repository 148, and potentially other data.

The compliance rules 139 can include hardware, software, and data access restrictions according to a compliance policy. The compliance policy can be configured by an administrator of an enterprise. In some cases, the data access restrictions can be based on access levels assigned to a user. For example, sensitive data, such as confidential data, may only be accessible for users assigned with a particular access level. In other cases, the department the user works in can determine what data the user can access.

In addition, the compliance rules 139 can also include constraints specified by an administrator for compliance of the client device 106 with the management system 103. In one example, the enterprise agent 130 can configure hardware or software functionality of the client device 106 such that the client device 106 is in conformance with the compliance rules 139. For instance, an administrator can specify whether Bluetooth® functionality, camera functionality, microphone functionality, or other suitable device functionality is permitted on the client device 106. Additionally, the enterprise agent 130 can identify when the client device 106 is not in compliance with the compliance rules 139, as well as other policies, and can take appropriate remedial actions, such as denying access to enterprise data, restricting access to particular networks, or enabling or disabling other functionality of the client device 106 of the enterprise agent 130.

The device data 142 can include indications of the state of the client device 106. In one example, these indications can specify applications that are installed on the client device 106, configurations or settings that are applied to the client device 106, user accounts associated with the client device 106, the physical location of the client device 106, the network to which the client device 106 is connected, and other information describing the current state of the client device 106. In other examples, the device data 142 can include a serial number, a media access control (MAC) address of a network interface card (NIC), manufacturer information, a Personal Identification Number (PIN) setup status, a status of Bluetooth®, camera or microphone functionality, or other information about the client device 106.

The networked environment 100 can also include 3$^{rd}$-party device management platform(s) 151 having one or more platform application programming interface(s) (API(s)) 154 that are associated with a platform, an operating system, a manufacturer or a type of a client device and accessible to the client device 106 or the management system 103. For example, the platform APIs 154 can be accessible via a Uniform Resource Identifier (URI) or other identifier that enables interactions with a representation of the platform APIs 154 over the network 112.

The platform APIs 154 can associated with device management for platforms, operating systems, and features by Google™, Apple™, or Microsoft™. The platform APIs 154 can be associated with the Chrome OS™ operating system, Android™ for Work, Google Play™ for Work, or Work Profiles by Google™, among other examples. It is also envisioned that the platform APIs 154 for device management of a client device 106 connected to a network 112 that is a wired or wireless network provided by an enterprise can be different from the platform APIs 154 for device management of a client device 106 connected to a network 112 that is the internet, or a "cloud" as such term is appreciated by one of skill in the art.

The metadata repository 148 can comprise payload snippets 148a, input files 128, device format templates 148b, or other data associated with operation of the management system 103. The payload snippets 148a can include snippets of payload for a device profile, such as at least one setting related to enforcing compliance of the client device 106 with one of the compliance rules 139. The input files 128 can include any structured data, such as data suitable to be parsed by the metadata parsers 133a. The device format templates 148b can include any suitable data related to transforming or reformatting a generic format document into a particular format for the client device 106 or the platform APIs 154.

The client device 106 can be representative of one or more client devices 106. The client device 106 can include a processor-based system, such as a computer system, that can include a desktop computer, a speaker system, a laptop computer, a personal digital assistant, a cellular telephone, a smartphone, a set-top box, a music player, a tablet computer system, an IoT device, or any other device with like capability. The client device 106 can also be equipped with networking capability or networking interfaces, including a localized networking or communication capability, such as a near-field communication (NFC) capability, radio-frequency identification (RFID) read or write capability, or other localized communication capability.

The client device 106 includes a platform 157 and an operating system 160. The operating system 160 can be configured to execute various applications such as the enterprise agent 130. Some applications can access network content served up by the management system 103 or other servers, thereby rendering a user interface on a display, such as a liquid crystal display (LCD), touch-screen display, or other type of display device. To this end, some applications can include a web browser or a dedicated application, and a user interface can include a network page, an application screen, or other interface. Further, applications can include device management applications, enterprise applications, social networking applications, word processors, spreadsheet applications, media viewing applications, and other applications.

In some examples, at least a portion of the client applications executed by the operating system 160 are "managed applications" where the enterprise agent 130 oversees or controls operation of the client applications. For instance, using the management console 115, an administrator of the management console 115 can distribute, secure, and track client applications installed on client devices 106 enrolled with the management system 103. In some examples, the enterprise agent 130 can configure and verify that managed applications operate in conformance with the compliance rules 139.

The client device 106 can also include a data store 163. The data store 163 can include memory of the client device 106 or any other storage resources on which data can be stored by the client device 106. The data store 163 can include a device profile 166. The device profile 166 can include a device profile that is configured to enforce software and/or hardware restrictions on the client device 106. The device profile can be specific to a platform, an operating system, a manufacturer or a type of the client device 106, and can include code configured for the platform 157 or configured to execute on the operating system 160. The data store 163 can include other data associated with the platform 157, the operating system 160, or the enterprise agent 130. The data stored in the data store 163, for example, can be associated with the operation of the various applications or functional entities described below.

Next, examples of the operation of the networked environment 100 are described in further detail.

Figure 2A:
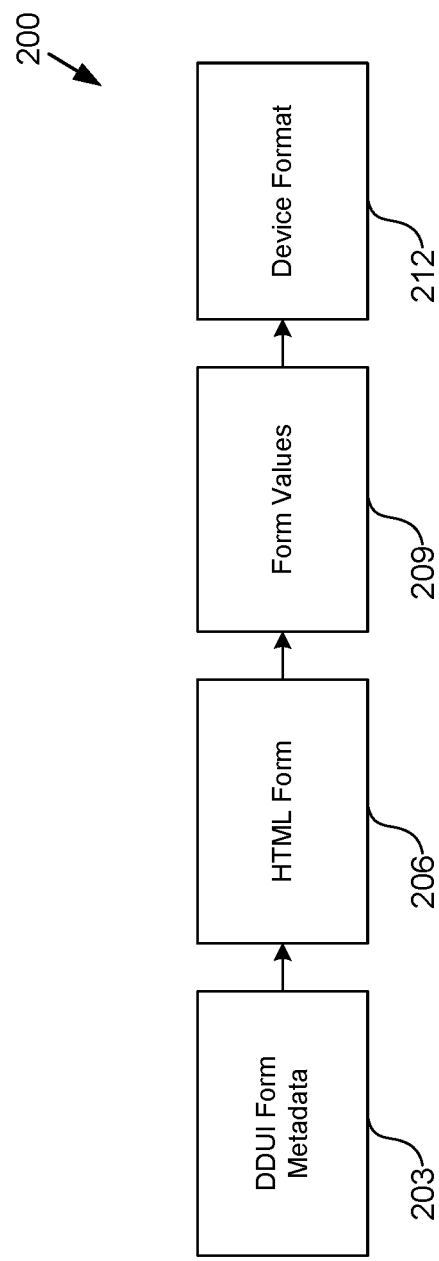
FIG. 2A is a flowchart illustrating examples of functionality implemented as portions of a management system according to various embodiments of the present disclosure.

FIG. 2A is a flowchart 200 illustrating examples of functionality implemented as portions of the management system 103 (FIGS. 1A and 1B). FIGS. 2B-2F illustrate further examples of the functionality including user interfaces, templates, and documents that can be understood in relation to the steps of the flowchart 200 as described below.

The present disclosure describes functionality that can make use of multiple data formats, e.g., along a transition from rendering a data driven user interface 127 for generating a profile document, to saving a generic format or device-dependent format of the profile document to the data store 124 or the platform APIs 154. For example, the metadata transform service 118 can a generate a data driven interface template, also referred to as a profile descriptor file, to allow the management console 115 to cause a data driven user interface 127 to be rendered with the required user interface elements without any code changes or any downtime for the management system 103.

At step 203 of FIG. 2A, the metadata transform service 118 can generate a data driven interface template for decoupling at least one component of the management system 103 from a platform, an operating system, a manufacturer or a type of the client device 106. FIG. 2B shows an example excerpt of a data driven interface template 215. FIG. 2B can also be seen as an example of DDUI Form Metadata (step 203 of FIG. 2A). The example data driven interface template 215 depicted in FIG. 2B can be used by the management console 115 and can cause a data driven user interface 127 having a "Content" tab for user policy to be rendered.

The structured data of the data driven interface template 215 of FIG. 2B depicts, for example, that the "Content" tab can have a label of "Content" and a plurality of fields each of which can be associated with an identifier and respective values as shown. There is a field labeled "Bookmark Bar" which can comprise "OptionData" including "User can show/hide the bookmarks bar," "Always show the bookmarks bar," or "Never show the bookmarks bar." There is also a field labeled "Editing Bookmarks" which can comprise a "FieldType" of 24 and "OptionData" including "Enable" or "Disable."

Figure 2C:
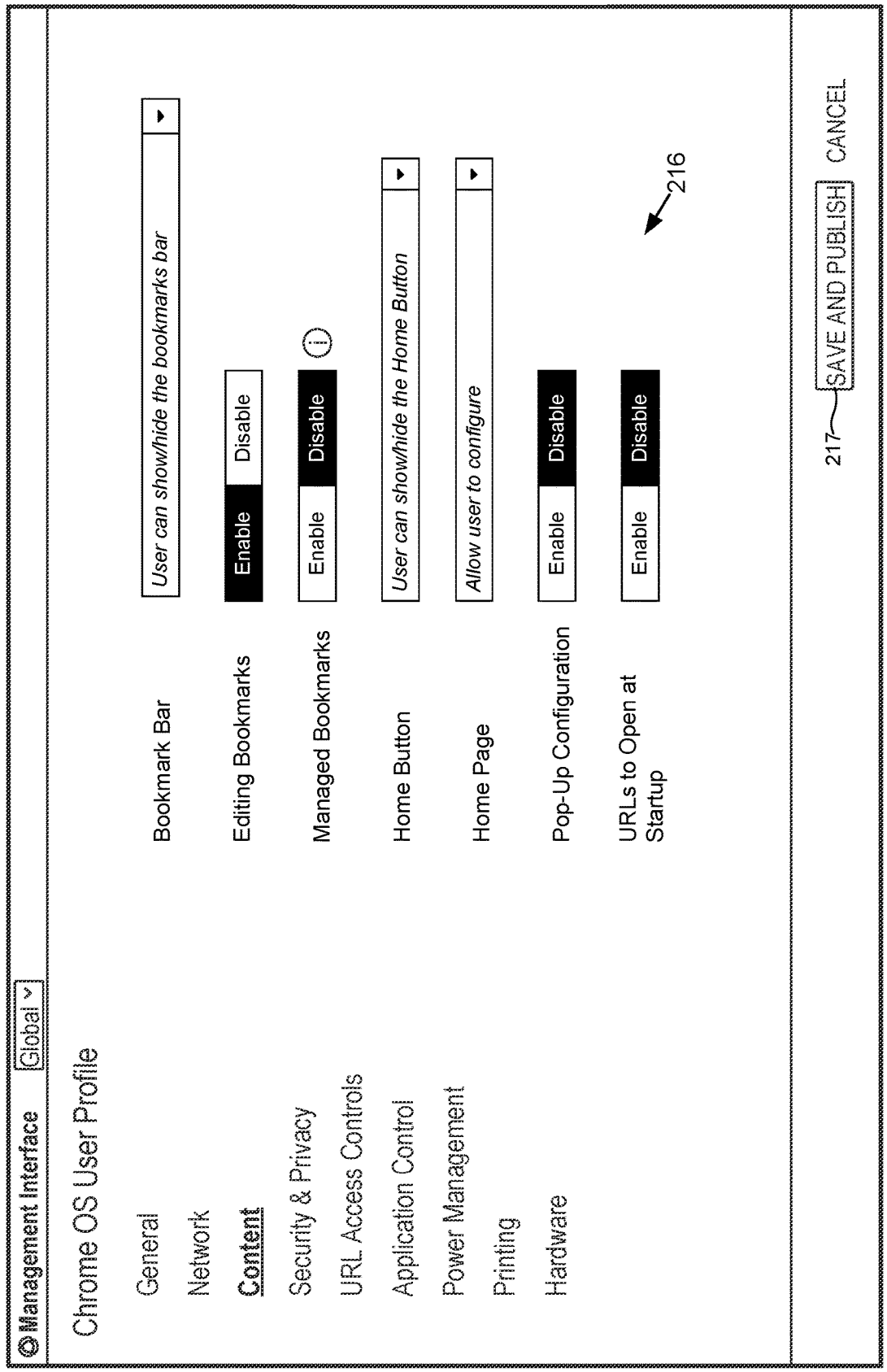
FIG. 2C is an example rendering of a data driven user interface with a form associated with the data driven interface template of FIG. 2B according to various embodiments of the present disclosure.

At step 206 of FIG. 2A, the management console 115 can render, based at least in part on the data driven interface template 215 (FIG. 2B), a data driven user interface 127 for configuring at least one of a plurality of profile payloads of a device profile for at least one of the client devices 106. FIG. 2C shows the management console 115 has caused a data driven user interface 127 associated with the data driven interface template 215 (FIG. 2B) to be rendered.

The data driven user interface 127 can include a form 216 having fields, values, user interface elements, etc., as specified in the data driven interface template 215 (FIG. 2B). The data driven user interface 127 of FIG. 2C has a "Content" tab with label of "Content" according to the data driven interface template 215 (FIG. 2B). There is a selectable element associated with the field labeled "Bookmark Bar" which shows the setting of "User can show/hide the bookmarks bar" is presently selected. The data driven user interface 127 includes an "Enable" option and a "Disable" associated with the "FieldType" of 24 and the "Editing Bookmarks" label according to the data driven interface template 215 (FIG. 2B). The data driven user interface 127 also includes a tooltip, that, when selected, would cause a tooltip with text as specified in the "Tooltip" of the data driven interface template 215 (FIG. 2B).

The data driven user interface 127 or the form 216 can include a user interface element 217 that is configured to post or otherwise transmit, when selected, values associated with the form 216 or other portions of the data driven user interface 127, or values associated with user interaction with the form 216 or the data driven user interface 127. For example, the example of FIG. 2C shows the user has interacted with the form 216 to specify "Enable" for "Editing Bookmarks" and "Disable" for "Managed Bookmarks." Selecting the user interface element 217 can cause the field values to be transmitted as a JSON string.

At step 209 of FIG. 2A, the metadata transform service 118 can obtain values associated with the data driven user interface 127 (FIG. 2C). FIG. 2D can be seen an example excerpt 218 of values of the form 216 of FIG. 2C obtained by the metadata transform service 118. The metadata transform service 118 can generate, based at least in part on the values associated with the data driven user interface 127 or the form 216 (FIG. 2C), a profile document for the management system 103.

The profile document can comprise a generic format document of at least one of a plurality of profile payloads for the platform, the operating system, the manufacturer or the type of the client device 106. FIG. 2E is an example excerpt 221 of a profile document that is a generic format document for the management system 103. The profile document can be generated in an instance in which the plurality of values are obtained from user interaction with the data driven user interface 127 (FIG. 2C). FIG. 2E depicts that the profile document can include a profile payload or "profile_payload" that is a generic key-value pair structure comprising a plurality of profile payloads of the device profile 166 (FIG. 1B) for the client device 106. Aspects of the profile payload including one or more key-value pair(s) can be used for managing setting(s) for feature(s) of the client device 106.

At step 212 of FIG. 2A, the metadata transform service 118 can cause a device readable document based at least in part on the generic format document (FIG. 2E) to be created. For example, the metadata transform service 118 can use one or more of the platform formatters 133c in an instance in which the client device 106 is notified to install the profile document. Examples of the present disclosure can also enable client side transformation of the form values (FIG. 2D), such as by including a ReturnContract in the DDUI Form Metadata (step 203 of FIG. 2A) and/or by including the ReturnContract in the data driven interface template 215 (FIG. 2B). This functionality can allow, for example, the values of form 216 (FIG. 2C) to be posted as a hierarchical or structured JSON object string. FIG. 2F is an example excerpt 224 of a device readable document for the management system 103. The metadata transform service 118 can generate a device readable document based at least in part on reformatting a generic format document or other generic representation for the platform, the manufacturer or the type of the client device 106. In the example of a device profile 166 for the Chrome OS™ operating system, the metadata transform service 118 can convert the posted values (FIG. 2D) embodied as the generic format document (FIG. 2E) into a particular format for a platform API 154 for a Google™ platform or operating system by looking up the device format template 148b that corresponds to these values and performing transformations or making substitutions.

Figure 2G:
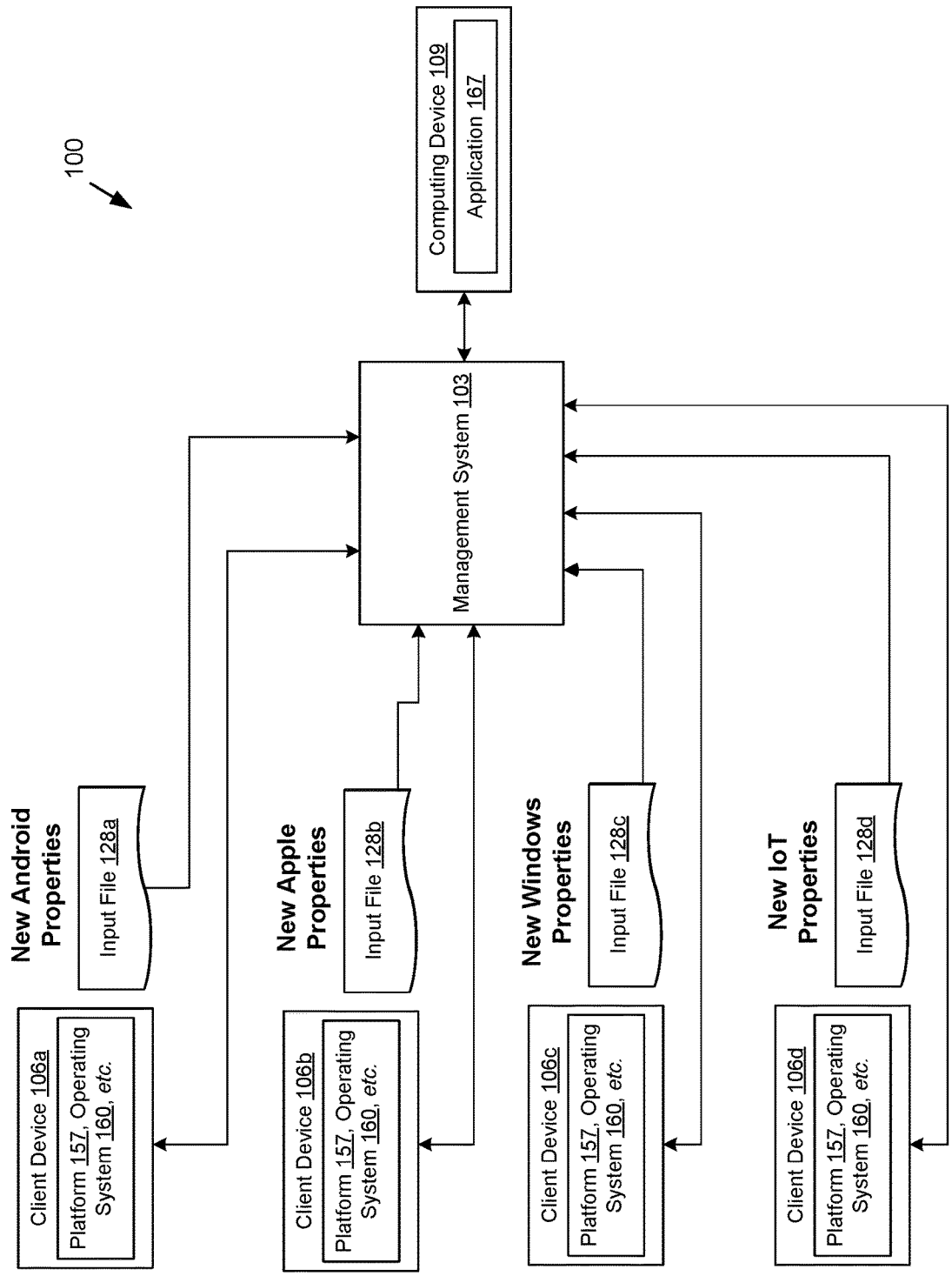
FIG. 2G is an example of the networked environment according to various embodiments of the present disclosure.
Figure 2H:
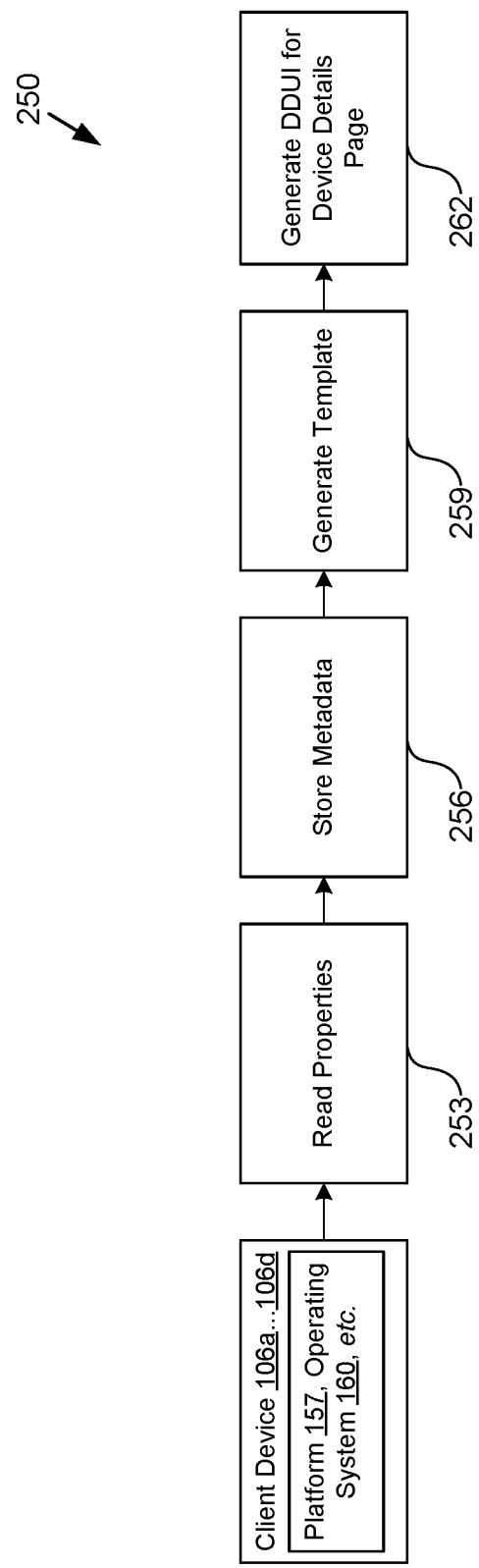
FIG. 2H is an example flowchart illustrating functionalities implemented by the management system according to various embodiments of the present disclosure.

FIG. 2G illustrates an example of the networked environment 100 (FIG. 1B). FIG. 2H is a flowchart 250 illustrating examples of functionality implemented as portions of the management system 103 (FIG. 1B). These examples illustrate that the management system 103 (FIG. 1B) can process attributes of the client devices 106a . . . 106d and/or render a user interface for device details in a data-driven manner.

Device manufactures can release new properties (e.g., device properties) which are applicable to new operating systems or updates to operating systems. Properties can include an association between a name (e.g., a key) and a value for details of the client devices 106a . . . 106d. The value can be a Personal Identification Number (PIN) setup status, a status of Bluetooth®, camera or microphone functionality, or other suitable status of device functionality of the client devices 106a . . . 106d. The properties can be coded or defined so they can be recognized by the management system 103 and shown in a user interface for device details rendered by the management system 103.

One example process of the management system 103 can involve the properties being coded or defined by a provider of the management system 103 before the property can become available to an enterprise that desires to use the management system 103 for management of the client devices 106 (FIG. 1B). This process can be followed for properties relating to any platform 157, operating system 160, etc., of the client devices 106a . . . 106d. For example, definitions for Android™, Apple™, or Windows™ may be defined by the provider of the management system 103.

In some examples it can be desirable for the management system 103 to make the properties for the platform 157, operating system 160, etc., of the client devices 106a . . . 106d available to an enterprise without being coded or defined by the provider of the management system 103. This can be particularly useful for client devices 106 which are Internet of things (IoT) devices. IoT devices include drones, cameras, or other physical objects that can be embedded with sensors, software, and other technologies for the purpose of connecting and exchanging data with other devices and systems over a network. New IoT devices and features are becoming available. The management system 103 can allow the enterprise to control the features and enforce security policies without the properties being coded or defined by the provider of the management system 103, and without requiring updates to the components of the management system 103.

FIG. 2G depicts an example where manufacturers have announced properties for client devices 106a . . . 106d which are Android™, Apple™, Windows™, and IoT devices, respectively. The input files 128a . . . 128d comprising the properties can be consumed by the management system 103 and stored as metadata in the data store 124 (FIG. 1B). When the client devices 106a . . . 106d report their properties, the management system 103 can associate the properties of any of the client devices 106a . . . 106d with the metadata in the data store 124 (FIG. 1B). The management system 103 can generate a user interface that is a device details page about one or more values for the properties of the client devices 106a . . . 106d. The device details page can be rendered by the application 167 on a display of the computing device 109.

In FIG. 2H, the flowchart 250 can be seen as providing further examples of the management system 103 generating a user interface having device details of the client devices 106a . . . 106d shown in FIG. 2G. At step 253, the management system 103 can read data about properties for the client devices 106a . . . 106d. For example, the management system 103 can determine that the client devices 106a . . . 106d have checked in to the management system 103 and sent the data about the properties. The properties can be related to the platform 157, the operating system 160, a manufacturer or a type of the client devices 106a . . . 106d. At step 256, the management system 103 can generate metadata associated with the data about the properties, and store the metadata in the data store 124 (FIG. 1B). The metadata can be key-value pairs or other suitable representations of device details that includes properties for the client devices 106a . . . 106d.

At step 259, the management system 103 can generate a device details template based on the metadata stored in step 256. At step 262, the management system 103 can generate a data driven user interface 127 (FIG. 1B) or other user interface that is a device details page based at least in part on the device details template. The user interface can allow values for properties of the client devices 106a . . . 106d to be read from the data store 124 (FIG. 1B) and rendered on a display of the computing device 109 (FIG. 2G).

Figure 3A:
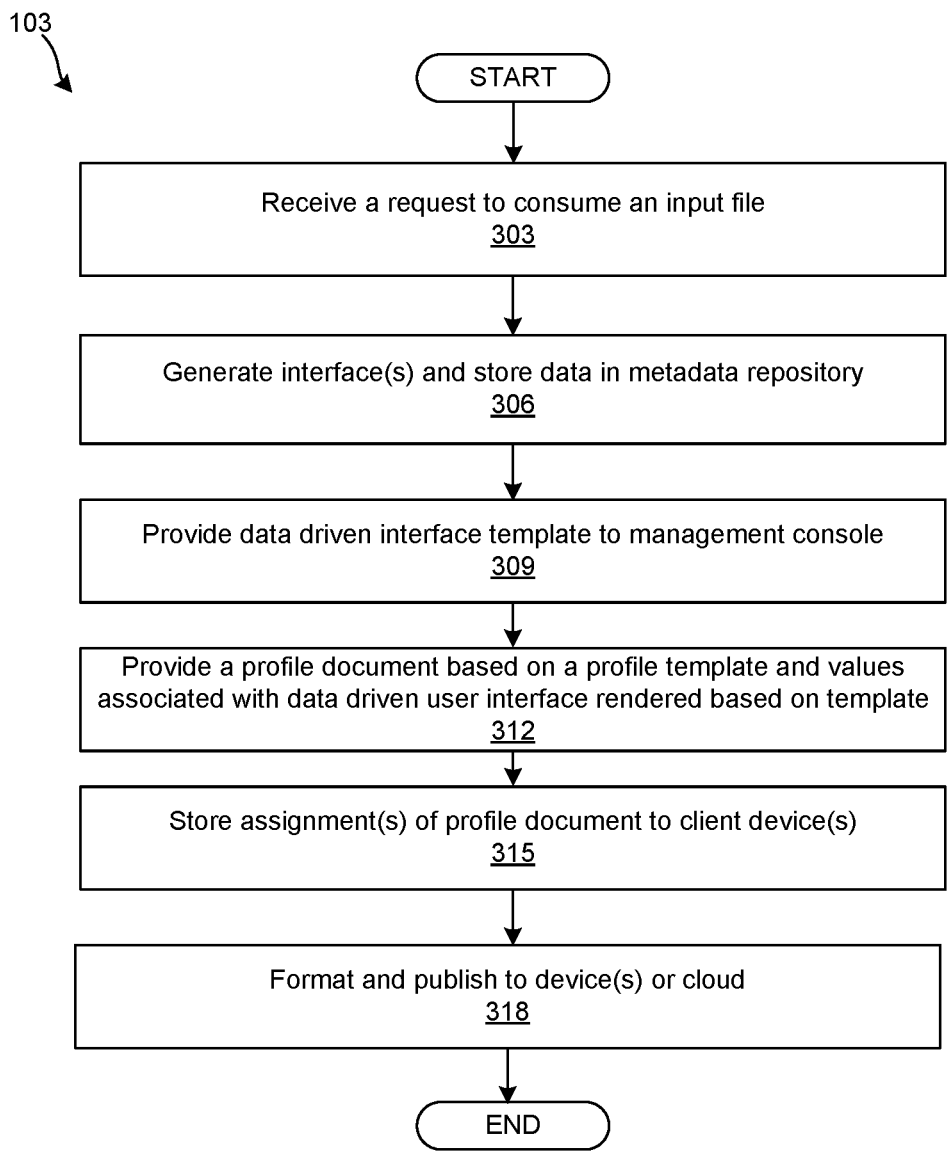
FIG. 3A is an example flowchart illustrating functionalities implemented by the management system according to various embodiments of the present disclosure.

Moving on to FIG. 3A, shown is a flowchart that provides one example of the operation of a portion of the management system 103 according to various examples. It is understood that the flowchart of FIG. 3A provides merely an example of the many different types of functional arrangements that can be employed to implement the operation of the portion of the management system 103 as described herein. FIG. 3A can also be seen as providing further examples of data driven interfaces for decoupling components of the management system 103 from the platform 157, the operating system 160, a manufacturer or a type of the client device 106.

Beginning with step 303, the management console 115 or other component of the management system 103 receives a request to consume an input file 128. The input file 128 can be associated with Administrative Templates (.ADMX) or device description framework (DDF) for MICROSOFT™ WINDOWS™, a configuration format for Android™, a configuration format for iOS™, or various other formats for device policies or device features. Examples of step 303 can include an administrator using a browser or other application 167 running on the computing device 109 to submit the input file 128 to the management console 115 or to upload the input file 128 to the metadata transform service 118. In some examples, the input file 128 is obtained from a profile descriptor file or other file that the metadata transform service 118 obtained from a manufacturer of the client device 106.

At step 306, the metadata transform service 118 can generate metadata parsers 133a, profile adapters 133b, platform formatters 133c, or other interfaces 133. The metadata transform service 118 can store data associated with the interfaces 133, or other data suitable for data-driven operating of components of the management system 103, in the metadata repository 148. The metadata transform service 118 can execute the metadata parsers 133a to parse metadata and store the payload snippets 148a and the device format templates 148b in the metadata repository 148.

At step 309, the metadata transform service 118 can provide a data driven interface template to the management console 115 and cause the data driven user interface 127 to be rendered. At step 312, the metadata transform service 118 can provide a profile document based on a profile template and values associated with a rendering of the data driven interface 127 based on the data driven interface template provided at step 309.

At step 315, the management system 103 can store XML, for a device profile based on for the profile document in the data store 124. The management system 103 can also store an assignment of the device profile to the client devices 106. After the device profile has been generated, the management system 103 can store the device profile in a command queue associated with the client device(s) 106. For instance, the device profile can be stored in a command queue provided by the device service 121.

At step 318, the device profile can be formatted according to the platform 157, the operating system 160, a manufacturer or a type of the client device 106. The device profile can be published to the client device(s) 106 or a cloud associated with the client device 106. In some examples, the device profile is published to the client device via one of the platform APIs 154. Then, the management system 103 proceeds to the end of the process.

In one example operation, the enterprise agent 130 on the client device 106 can check in to the device service 121. The enterprise agent 130 can obtain a generic representation of a profile document from a queue provided by the device service 121. The client device 106 can execute one or more of the platform formatters 133c to create a device readable document by formatting the generic representation of the profile document for the platform 157, the operating system 160, a manufacturer or a type of the client device 106. In other examples, the platform formatters 133c can format (or associate) the device readable document with a particular format for the platform API 154 based at least in part on the platform 157 or the operating system 160 of the client device 106. The device readable document can be published to the client device 106 by functions of the device service 121, the platform API 154, or any suitable mechanism for providing a device-readable format to the client device 106. In another example operation, the enterprise agent 130 can send a Personal Identification Number (PIN) setup status, or a status of Bluetooth®, camera or microphone functionality to be stored as the device data 142. The metadata transform service 118 can provide a data driven interface template to the management console 115 and cause the data driven user interface 127 to be rendered that shows, for example, a device details page based at least in part on the device data 142.

Figure 3B:
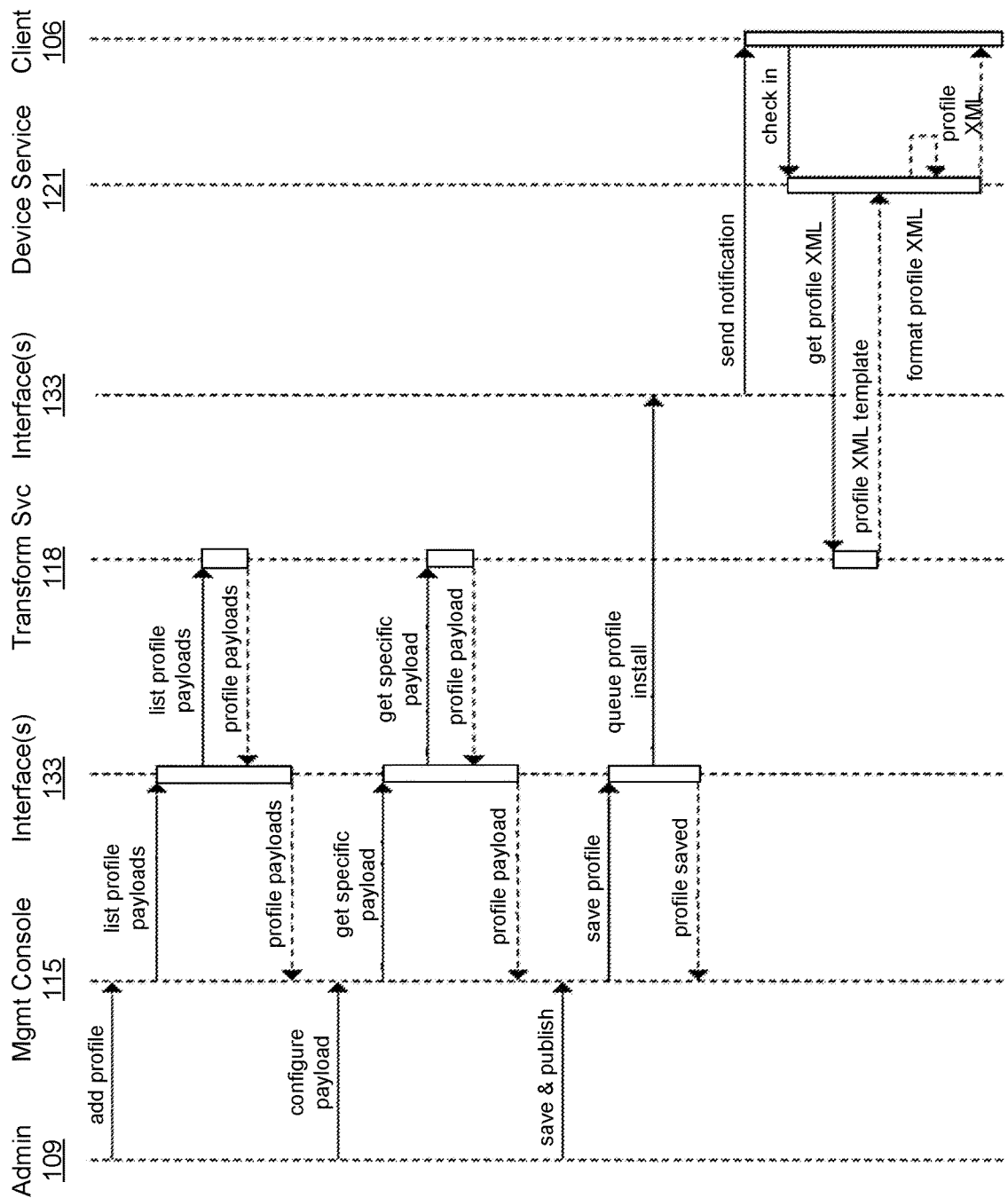
FIG. 3B is a sequence diagram illustrating examples of interaction between an administrative device, the management system, and a client device according to various embodiments of the present disclosure.

Referring next to FIG. 3B, shown is a sequence diagram illustrating example interactions within the networked environment 100 of FIG. 1B. The management console 115 of the management system 103 can receive a request to add a profile for the client device 106. The management console 115 can use the interfaces 133 to interact with the metadata transform service 118 and return a list of profile payloads that can be rendered as part of a data driven user interface 127.

Next, the management console 115 can receive a request to configure a payload for the client device 106. The management console 115 can use the interfaces 133 to interact with the metadata transform service 118 and return a specific profile payload for the client device 106. The management console 115 can receive a request to save the device profile to the data store 124 such as by the user interface element 217 (FIG. 2C) transmitting the request. The management console 115 can also cause the device profile to be published to the client device 106 as the device profile 166. Then, the process can proceed to completion.

Figure 4A:
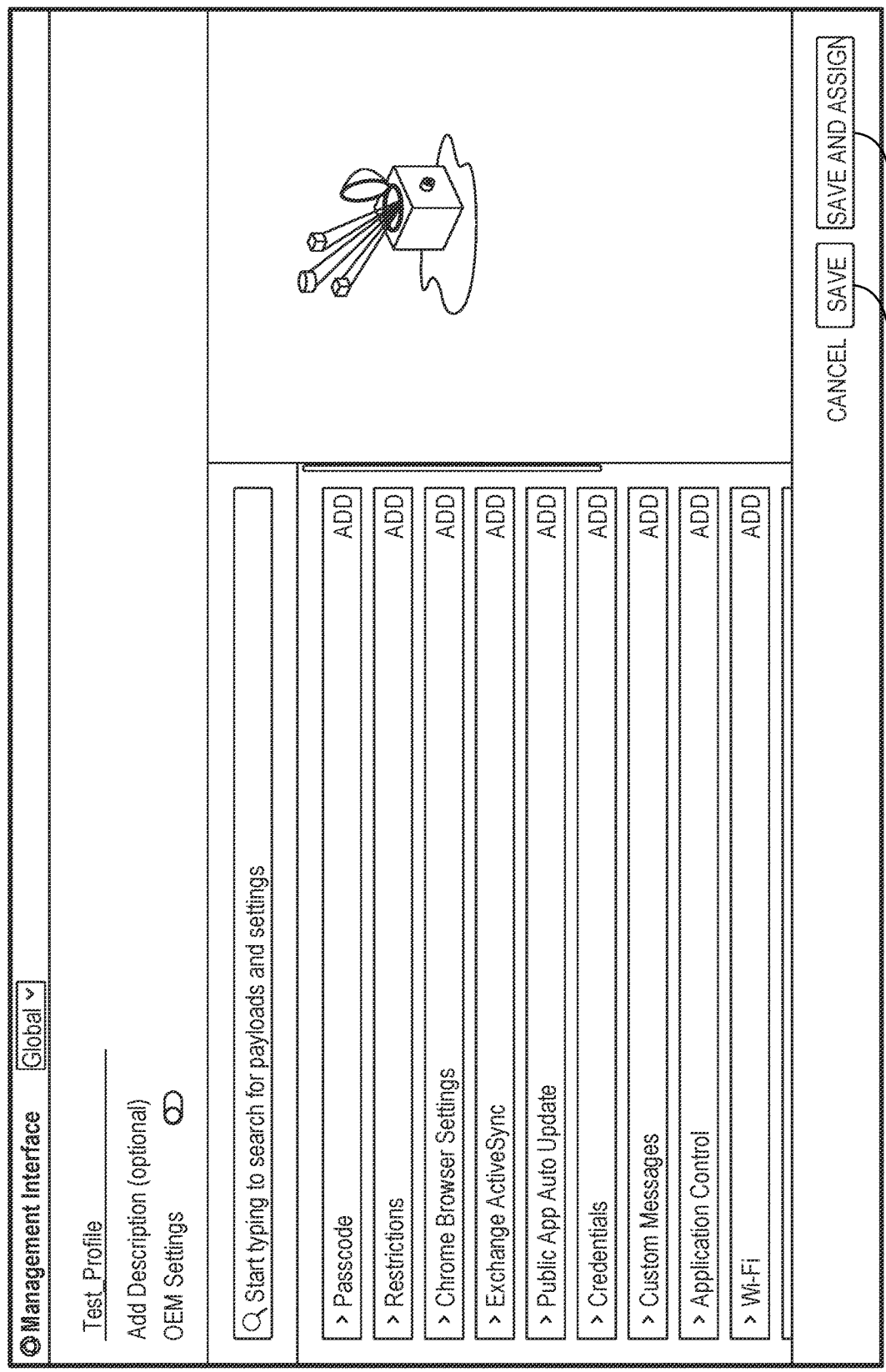

Moving on to FIGS. 4A-4D, shown are drawings of various examples of the data driven user interface 127. Referring to FIG. 4A, the data driven user interface 127 shows a list of profile payloads that can be associated with a device profile 166 for one or more of the client devices 106. FIG. 4A depicts that there is a search field configured to search for payloads and settings. The data driven user interface 127 shows that several profile payloads and settings that can be added, including "Passcode," "Restrictions," "Chrome Browser Settings," "Exchange ActiveSync," "Public App Auto Update," "Credentials," and "Custom Messages." The data driven user interface 127 includes a user interface element 403 that causes payloads or settings to be to the data store 124, and a user interface element 406 that can further cause payloads or settings to be assigned to client devices 106 or organizational groups associated with the client devices 106.

Figure 4B:
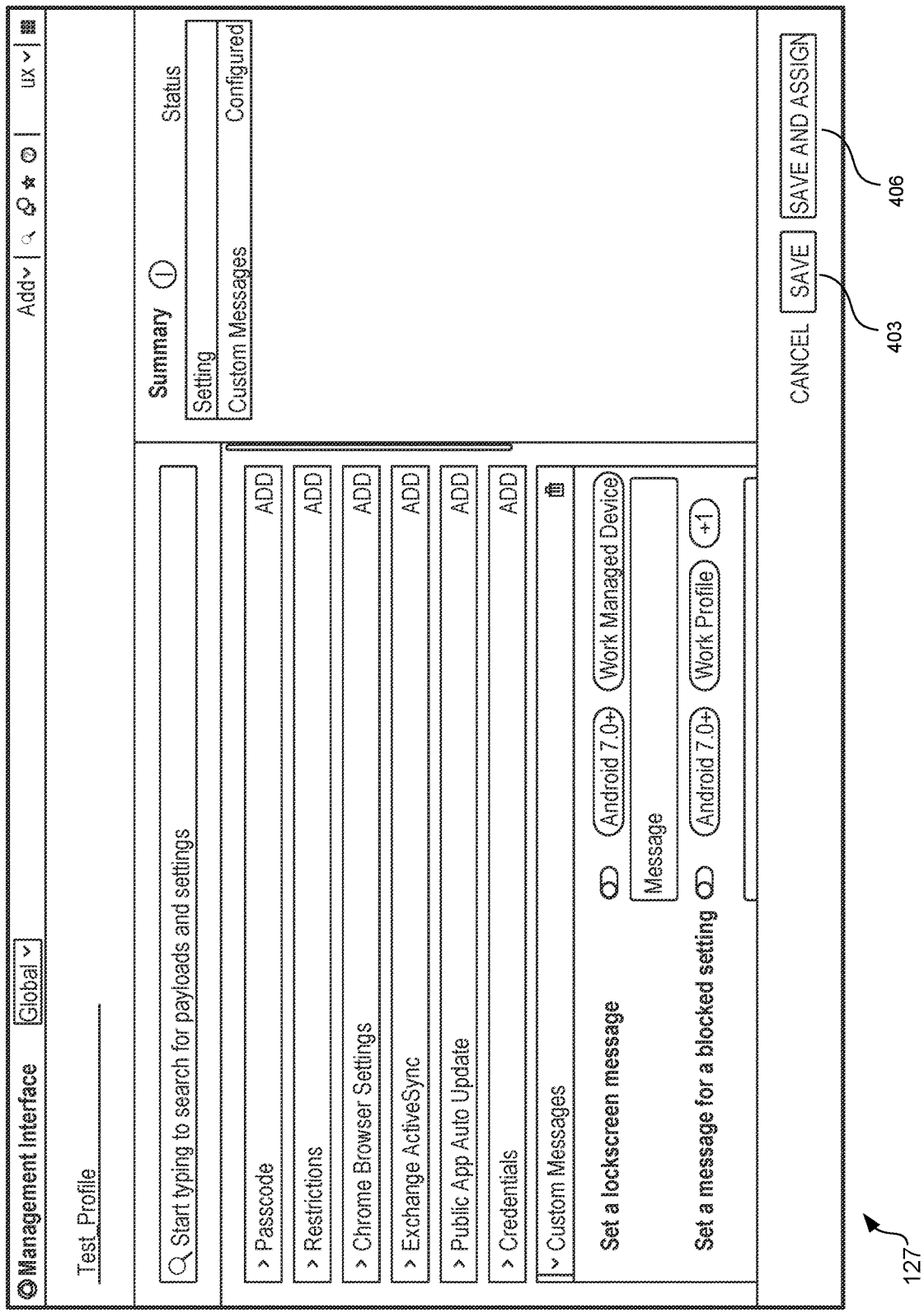

Referring to FIG. 4B, the data driven user interface 127 shows settings related to the "Custom Messages" payload including a toggle for "Set a lockscreen message" and a toggle for "Set a message for a blocked setting." Text of "Message" has been entered into an editable text field to be used as the payload for the setting of the "lockscreen message." The data driven user interface 127 includes a list of the settings that have been configured. FIG. 4B shows that the status for the "Custom Messages" setting is "Configured."

In FIG. 4C, a data driven user interface 127 for causing payloads or settings to be assigned to client devices 106 or groups is provided. The "Custom Messages" setting depicted in FIG. 4B has been assigned to a subset of the client devices 106 out of a plurality of the client devices 106 that are enrolled with the management system 103 as managed devices. The user interface element 409, when selected, can cause the "Custom Messages" setting to be published or transmitted to the subset of the client devices 106. The user interface element 412 can cause a data driven user interface 127 to be rendered that is associated with a listing of the subset of the client devices 106, as shown in FIG. 4D.

Figures 0, 5:
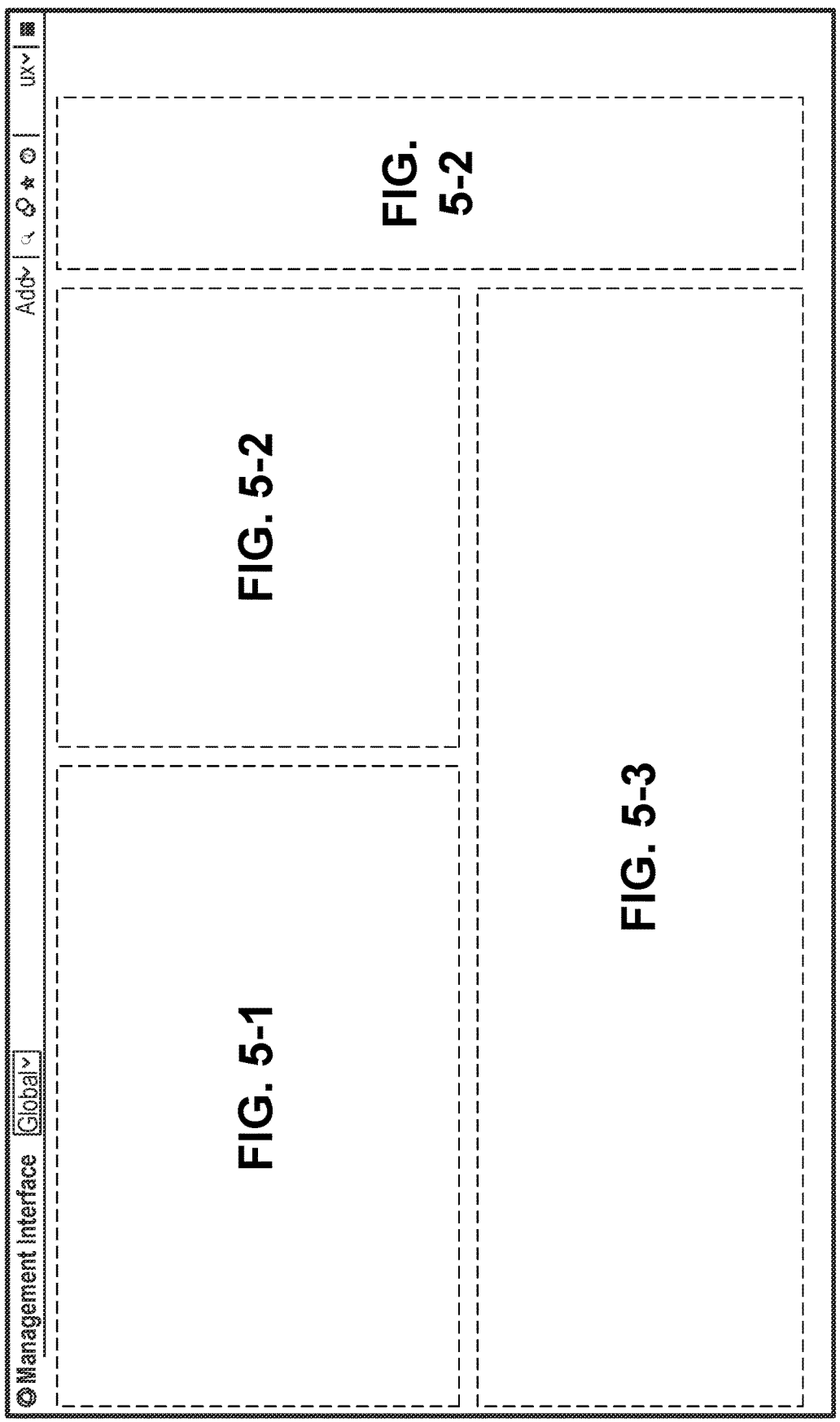

Moving on to FIGS. 5-0 to 5-3, shown are drawings of an administrative user interface 500 for adding features and release notes related to the platform 157, the operating system 160, a manufacturer or a type of the client device 106 (FIG. 1B). The management service 129 (FIG. 1B) operates to allow administrative users such as product managers (PMs), developers, or engineers to add new features to the management system 103. The administrative user interface 500 allows administrative users to view current profile features, add new features, and add release notes, among other things. FIG. 5-0 shows that the administrative user interface 500 can comprise a plurality of regions examples of which are depicted as FIGS. 5-1, 5-2, and 5-3 and further discussed below.

Referring to FIG. 5-1, an editor 503 is provided for editing a specific payload related to a platform 157. A "Section," "Platform," or "Payload" can be selected which causes the administrative user interface 500 to retrieve metadata from the metadata repository 148. For example, the metadata can be one of the data driven interface templates (FIG. 2B). FIG. 5-1 shows that after picking a platform, a specific profile payload such as "Email" can be selected. The editor 503 renders and allows editing of the metadata associated with the specific profile payload. When a new profile is being added, the editor 503 can provide a default starting metadata file and device delivery file to work from.

Figures 2, 5:
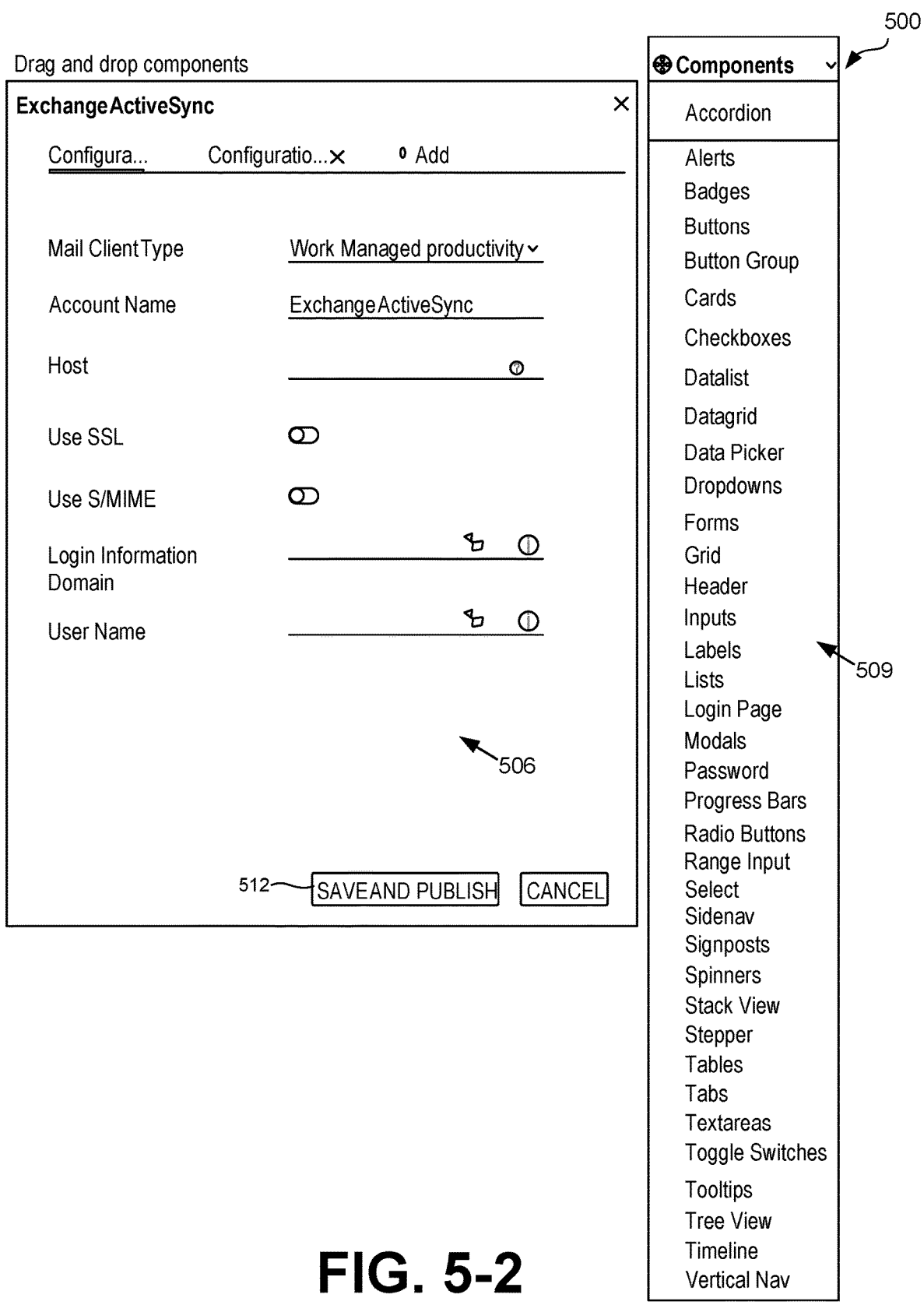

In FIG. 5-2, the administrative user interface 500 includes a user interface 506 that has been rendered based on metadata (or edited metadata) of the editor 503 (FIG. 5-1). In this way, the administrative user interface 500 can preview a data driven user interface 127 that can be rendered based on the metadata. The administrative user interface 500 shows the UI look and feel for the specific profile payload selected from FIG. 5-1.

Administrative users can modify metadata files and view how results of modifications will look when rendered as a data driven user interface 127, as shown in FIGS. 5-1 and 5-2. The user interface 506 shows an "Exchange ActiveSync" profile with a tab labeled "Configuration." The "Configuration" tab includes settings including "Mail Client Type," "Account Name," and "Host," which are each associated with selectable elements and respective values (such as "Work Managed productivity" for "Mail Client Type").

The administrative user interface 500 depicted in FIG. 5-2 includes a components section 509 having components that can be selected (e.g., "drag and drop") to be added to the user interface 506, which can in turn cause the selected components to be added (or removed) from the metadata displayed in the editor 503 (shown in FIG. 5-1). The components section 509 can therefore allow an administrative user to add new user interface components to build new features into the data driven user interface 127. After a component from the components section 509 is selected, or dragged into the user interface 506, the administrative user interface 500 can cause a block of code to be automatically added to the metadata in the editor 503 or added to a metadata file stored in the data store 124.

The administrative user interface 500 can also include a user interface element 512 which causes the edited metadata to be saved to the metadata repository 146 and published to a production version of the management system 103. If the metadata is not different from a metadata file that is already in use, the administrative user interface 500 or the metadata transform service 118 can cause a notification to be rendered or to be sent to the administrative user.

Moving on to FIG. 5-3, an editor 515 is provided that can present XML that can be used to transform the metadata file (FIG. 5-1) into a device readable document for the client device 106. The administrative user can use the editor 515 to add XML for any new features to be added into a device profile 166 for the client device 106, such as new features related to the platform 157, the operating system 160, a manufacturer or a type of the client device 106.

The administrative user interface 500 depicted in FIG. 5-3 also includes an entry field where release notes about the new metadata can be entered. A publish user interface element 518 is provided that, when selected, can cause the release notes or data about the release notes to be saved in the data store 124. The management system 103 can consolidate release note changes committed between public updates to the metadata transform service 118 into a single release note change for a public release note page about the management system 103.

The management system 103, client devices 106, the computing device 109, and the $3^{rd}$-party device management platforms 151 and other computing devices can include at least one processor circuit, for example, having a processor and at least one memory device, both of which couple to a local interface, respectively. The client device 106 can include, for example, at least one computer, a mobile device, smartphone, a table computer, a speaker system, a personal assistant device, a computing device, or like device. The local interface can include, for example, a data bus with an accompanying address/control bus or other bus structure.

A number of software components are stored in the memory and executable by a processor. In this respect, the term "executable" means a program file that is in a form that can ultimately be run by the processor. Examples of executable programs can be, for example, a compiled program that can be translated into machine code in a format that can be loaded into a random access portion of one or more of the memory devices and run by the processor, code that can be expressed in a format such as object code that is capable of being loaded into a random access portion of the one or more memory devices and executed by the processor, or code that can be interpreted by another executable program to generate instructions in a random access portion of the memory devices to be executed by the processor. An executable program can be stored in any portion or component of the memory devices including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

Memory can include both volatile and nonvolatile memory and data storage components. Also, a processor can represent multiple processors and/or multiple processor cores, and the one or more memory devices can represent multiple memories that operate in parallel processing circuits, respectively. Memory devices can also represent a combination of various types of storage devices, such as RAM, mass storage devices, flash memory, or hard disk storage. In this case, a local interface can be an appropriate network that facilitates communication between any two of the multiple processors or between any processor and any of the memory devices. The local interface can include additional systems designed to coordinate this communication, including, for example, performing load balancing. The processor can be of electrical or of some other available construction.

The client devices 106 and the computing device 109 can include a display upon which user interface(s) generated by the application 167, the enterprise agent 130, or another application can be rendered. The client device 106 can also include one or more input/output devices that can include, for example, a capacitive touchscreen or other type of touch input device, fingerprint reader, or keyboard.

The metadata transform service 118, the enterprise agent 130, and other various services and functions described can be embodied in software or code executed by general purpose hardware as discussed above. As an alternative, the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include discrete logic circuits having logic gates for implementing various logic functions upon an application of one or more data signals, application specific integrated circuits (ASICs) having appropriate logic gates, field-programmable gate arrays (FPGAs), or other components.

The sequence diagram and flowcharts show examples of the functionality and operation of an implementation of portions of components described. If embodied in software, each block can represent a module, segment, or portion of code that can include program instructions to implement the specified logical function(s). The program instructions can be embodied in the form of source code that can include human-readable statements written in a programming language or machine code that can include numerical instructions recognizable by a suitable execution system such as a processor in a computer system or other system. The machine code can be converted from the source code. If embodied in hardware, each block can represent a circuit or a number of interconnected circuits to implement the specified logical function(s).

Although the sequence diagram and flowcharts show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some examples, one or more of the blocks shown in the drawings can be skipped or omitted.

Also, any logic or application described that includes software or code can be embodied in any non-transitory computer-readable medium for use by or in connection with an instruction execution system such as a processor in a computer system or other system. In this sense, the logic can include, for example, statements including instructions and declarations that can be fetched from the computer-readable medium and executed by the instruction execution system. In the context of the present disclosure, a "computer-readable medium" can be any medium that can contain, store, or maintain the logic or application described for use by or in connection with the instruction execution system.

The computer-readable medium can include any one of many physical media, such as magnetic, optical, or semiconductor media. More specific examples of a suitable computer-readable medium include solid-state drives or flash memory. Further, any logic or application described can be implemented and structured in a variety of ways. For example, one or more applications can be implemented as modules or components of a single application. Further, one or more applications described can be executed in shared or separate computing devices or a combination thereof. For example, a plurality of the applications described can execute in the same computing device, or in multiple computing devices.

The examples described above are merely examples of implementations to set forth for a clear understanding of the principles of the disclosure. Many variations and modifications can be made to the examples described above without departing substantially from the spirit and principles of the disclosure. All such modifications and variations are intended to be included herein within the scope of this disclosure.

Therefore, the following is claimed:

1. A non-transitory computer-readable medium storing a plurality of instructions executable by a computing device, the plurality of instructions being configured to cause the computing device to at least:
   generate a data driven interface template for decoupling at least one component of a management service from a platform, a manufacturer or a type of a client device;
   render, based at least in part on the data driven interface template, a data driven user interface for configuring at least one of a plurality of profile payloads of a device profile;
   generate, based at least in part on a plurality of values associated with the data driven user interface, a profile document in an instance in which the plurality of values are obtained from the data driven user interface, wherein the profile document comprises a generic representation of the device profile for the platform, the manufacturer or the type of the client device;
   store the profile document in a command queue associated with a client device matching the device profile, wherein the client device is enrolled as a managed device with a management service; and
   cause the client device to retrieve the profile document from the command queue.

2. The non-transitory computer-readable medium of claim 1, wherein the instructions are further configured to cause the computing device to at least:
   cause a device readable document based at least in part on the generic representation to be created in an instance in which the client device is notified to install the profile document.

3. The non-transitory computer-readable medium of claim 2, wherein the instructions are further configured to cause the computing device to at least:
   generate the device readable document based at least in part on reformatting the generic representation for the platform, the manufacturer or the type of the client device; and
   provide the device readable document to the client device.

4. The non-transitory computer-readable medium of claim 1, wherein the computing device generates the data driven interface template based at least in part on metadata for managing, based at least in part on the at least one of the profile payloads, at least one feature of the client device associated with the platform, the manufacturer or the type of the client device.

5. The non-transitory computer-readable medium of claim 4, wherein the instructions are further configured to cause the computing device to at least:
   obtain an input file comprising the metadata.

6. The non-transitory computer-readable medium of claim 4, wherein the instructions are further configured to cause the computing device to at least:
   generate a user interface comprising an editor for obtaining an edited version of the metadata, wherein the user interface is configured to render a preview of the data driven user interface based at least in part on the edited version of the metadata.

7. The non-transitory computer-readable medium of claim 1, wherein the data driven user interface comprises a form, wherein the plurality of values are obtained in the instance in which the form is submitted.

8. A system, comprising:
   at least one computing device; and
   program instructions executable in the at least one computing device that, when executed by the at least one computing device, cause the at least one computing device to:
      generate a data driven interface template for decoupling at least one component of a management service from a platform, a manufacturer or a type of a client device;
      render, based at least in part on the data driven interface template, a data driven user interface for configuring at least one of a plurality of profile payloads of a device profile;
      generate, based at least in part on a plurality of values associated with the data driven user interface, a profile document in an instance in which the plurality of values are obtained from the data driven user interface, wherein the profile document comprises a generic representation of the at least one of the plurality of profile payloads for the platform, the manufacturer or the type of the client device;
      store the profile document in a command queue associated with a client device matching the device profile, wherein the client device is enrolled as a managed device with a management service; and
      cause the client device to retrieve the profile document from the command queue.

9. The system of claim 8, wherein the program instructions cause the computing device to:
   cause a device readable document based at least in part on the generic representation to be created in an instance in which the client device is notified to install the profile document.

10. The system of claim 9, wherein the program instructions cause the computing device to:
    generate the device readable document based at least in part on reformatting the generic representation for the platform, the manufacturer or the type of the client device; and
    provide the device readable document to the client device.

11. The system of claim 8, wherein the computing device generates the data driven interface template based at least in part on metadata for managing, based at least in part on the at least one of the profile payloads, at least one feature of the client device associated with the platform, the manufacturer or the type of the client device.

12. The system of claim 11, wherein the program instructions cause the computing device to:
obtain an input file comprising the metadata.

13. The system of claim 11, wherein the program instructions cause the computing device to:
generate a user interface comprising an editor for obtaining an edited version of the metadata, wherein the user interface is configured to render a preview of the data driven user interface based at least in part on the edited version of the metadata.

14. The system of claim 8, wherein the data driven user interface comprises a form, wherein the plurality of values are obtained in the instance in which the form is submitted.

15. A method, comprising:
generating, by a computing device, a data driven interface template for decoupling at least one component of a management service from a platform, a manufacturer or a type of a client device;
rendering, based at least in part on the data driven interface template, a data driven user interface for configuring at least one of a plurality of profile payloads of a device profile;
generating, based at least in part on a plurality of values associated with the data driven user interface, a profile document in an instance in which the plurality of values are obtained from the data driven user interface, wherein the profile document comprises a generic representation of the at least one of the plurality of profile payloads for the platform, the manufacturer or the type of the client device;
store the profile document in a command queue associated with a client device matching the device profile, wherein the client device is enrolled as a managed device with a management service; and
cause the client device to retrieve the profile document from the command queue.

16. The method of claim 15, further comprising:
causing, by the computing device, a device readable document based at least in part on the generic representation to be created in an instance in which the client device is notified to install the profile document.

17. The method of claim 16, further comprising:
generating, by the computing device, the device readable document based at least in part on reformatting the generic representation for the platform, the manufacturer or the type of the client device; and
providing, by the computing device, the device readable document to the client device.

18. The method of claim 15, wherein the computing device generates the data driven interface template based at least in part on metadata for managing, based at least in part on the at least one of the profile payloads, at least one feature of the client device associated with the platform, the manufacturer or the type of the client device.

19. The method of claim 18, further comprising:
generating, by the computing device, a user interface comprising an editor for obtaining an edited version of the metadata, wherein the user interface is configured to render a preview of the data driven user interface based at least in part on the edited version of the metadata.

20. The method of claim 15, wherein the data driven user interface comprises a form, wherein the plurality of values are obtained in the instance in which the form is submitted.

* * * * *